(12) United States Patent  (10) Patent No.: US 7,525,683 B2
Terada  (45) Date of Patent: Apr. 28, 2009

(54) IMAGE FORMING APPARATUS

(75) Inventor: Kohei Terada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 971 days.

(21) Appl. No.: 11/071,323

(22) Filed: Mar. 4, 2005

(65) Prior Publication Data

US 2005/0195445 A1    Sep. 8, 2005

(30) Foreign Application Priority Data

Mar. 5, 2004    (JP)    ............................. 2004-063200

(51) Int. Cl.
*G06F 15/00*    (2006.01)
*B65H 5/22*    (2006.01)

(52) U.S. Cl. ...................... 358/1.3; 271/3.01

(58) Field of Classification Search ................. 358/400, 358/500, 401, 474, 498, 1.3, 501, 505, 496; 271/3.03, 3.01, 3.05, 3.08, 8.1
See application file for complete search history.

(56) References Cited

U.S. PATENT DOCUMENTS

| 5,743,519 | A * | 4/1998 | Chang et al. ............. 271/10.11 |
| 5,844,687 | A | 12/1998 | Nagane et al. |
| 6,714,757 | B2 | 3/2004 | Amagai et al. |
| 7,184,182 | B1 * | 2/2007 | Kuroda et al. ................ 358/498 |
| 2005/0231772 | A1 * | 10/2005 | Kitaoka et al. .............. 358/498 |
| 2005/0232653 | A1 * | 10/2005 | Murooka ..................... 399/92 |
| 2006/0115059 | A1 * | 6/2006 | Nobe ..................... 379/100.01 |
| 2006/0221165 | A1 * | 10/2006 | Kato ........................... 347/104 |
| 2006/0261539 | A1 * | 11/2006 | Terada ......................... 271/162 |
| 2007/0285741 | A1 * | 12/2007 | Sato et al. .................... 358/497 |
| 2008/0001343 | A1 * | 1/2008 | Kato ........................... 271/3.14 |
| 2008/0055660 | A1 * | 3/2008 | Tsuzuki ..................... 358/400 |

FOREIGN PATENT DOCUMENTS

| JP | 4105458 | 4/1992 |
| JP | 5037684 A2 | 2/1993 |
| JP | 8110660 A2 | 4/1996 |
| JP | 8183224 | 7/1996 |
| JP | 2000255138 | 9/2000 |
| JP | 2003110820 A | 4/2003 |

OTHER PUBLICATIONS

Notification of Reason for Rejection dated May 15, 2007 in Japanese Application No. 2004-063200 and English translation thereof.

* cited by examiner

*Primary Examiner*—Jerome Grant, II
(74) *Attorney, Agent, or Firm*—Banner & Witcoff, Ltd

(57) ABSTRACT

An image forming apparatus includes a reading mechanism having an original placement portion, a recording mechanism having a medium supply tray and a reversing mechanism, a casing that houses the recording mechanism, and an operating section through which the image forming apparatus is manipulated. A longitudinal direction of the original placement portion is substantially parallel with a width direction of the casing and the operating section is disposed on a front side of the reading mechanism. A longitudinal direction of the medium supply tray is substantially parallel with a depth direction that is perpendicular to the width direction of the casing. The reversing mechanism is disposed close to a rear end side in the depth direction. A dimension of the recording mechanism in the depth direction is not more than a sum of a depth of the reading mechanism plus a depth of the operating section.

6 Claims, 8 Drawing Sheets

IMAGE FORMING APPARATUS

BACKGROUND OF THE INVENTION

1. Field of the Invention

The present invention relates to an image forming apparatus.

2. Description of the Related Art

Japanese Patent No. 3397741 discloses a conventional image forming apparatus that can be used as a scanner, a printer, a copier, etc., in a state of being connected to a personal computer or the like. This image forming apparatus is equipped with a printer unit for recording and a scanner unit for reading of an image.

Both of the printer unit and the scanner unit should be wide and long enough to deal with a recording sheet or original document of about the A4 size and hence occupy large spaces. Therefore, a measure is taken to minimize the space necessary for installation; more specifically, a two-stage structure is employed in which the printer unit is disposed below and the scanner unit is disposed above the printer unit.

SUMMARY OF THE INVENTION

However, in many cases, the image forming apparatus of the above kind are configured in such a manner that a part of a sheet feed mechanism for supplying a sheet to the printer unit projects from a casing thereof. For example, this results in problems that the installation space is increased by an amount corresponding to the projected part, the apparatus cannot be packed easily at the time of shipment because of projections and recesses, and the design performance of the entire apparatus is low. In addition, where a sheet feed tray projects from the casing to a large extent, sheets are set on the tray in an exposed state and hence dust, stain, etc., may stick to or be formed on those sheets. This necessitates a tray cover for covering sheets, which makes the apparatus even bulkier.

The present invention provides an image forming apparatus that can be reduced in installation space and increased or improved in ease of packing, design performance, etc.

According to an aspect of the invention, there is provided an image forming apparatus including: a reading mechanism that reads an image on an original document, the reading mechanism having an original placement portion on which the original document is placed; a recording mechanism that records an image on a recording medium, the recording mechanism having a medium supply tray on which the recording medium is set and a reversing mechanism that reverses a transporting direction of the recording medium; a casing that houses the recording mechanism, the casing being stacked with respect to the reading mechanism; and an operating section through which the image forming apparatus is manipulated; wherein the reading mechanism is disposed in such a manner that a longitudinal direction of the original placement portion is substantially parallel with a width direction of the casing and the operating section is disposed on a front side of the reading mechanism; the medium supply tray is disposed in such a manner that a longitudinal direction of the medium supply tray is substantially parallel with a depth direction that is perpendicular to the width direction of the casing, and the reversing mechanism is disposed on a rear end side in the depth direction; and a rear end position of the reversing mechanism is set substantially the same as a rear end position of the reading mechanism, and a dimension of the recording mechanism in the depth direction is equal to or less than a sum of a depth of the reading mechanism plus a depth of the operating section.

In the image forming apparatus, the reading mechanism is disposed with such orientation that the longitudinal direction of the original placement portion is approximately parallel with the width direction of the casing and the operating section is disposed in front of the reading mechanism. The recording medium is disposed with such orientation that the longitudinal direction of the medium supply tray is approximately parallel with the depth direction of the casing. Setting the rear end position of the reversing mechanism the same as the rear wall position of the reading mechanism allows the recording mechanism to fit into a range that is the sum of the depth of the reading mechanism plus the depth of the operating section.

The recording medium is disposed so as to fit into the range having the same depth as the reading mechanism plus the operating section. In particular, employing a medium reversing type mechanism as a part of a mechanism for sheet feeding and election and setting the rear end portion of the reversing mechanism at a position that is as close to the rear wall position of the reading mechanism as possible allow the medium supply tray, which is longest and hence tends to project outward, to fit into the range that is the sum of the depth of the reading mechanism plus the depth of the operating section. Further, since certain spaces are secured between side ends of a sheet feed path along which a sheet moves and side ends of the reading mechanism, driving mechanisms for medium feeding, ink-related components, etc., can be disposed there properly.

With the above measures, all the necessary mechanisms can be housed in an angular casing that occupies a range defined by the width and the depth of the reading mechanism plus the depth of the operating section. This facilitates packing at the time of shipment and reduces the installation space. Further, the design performance of the entire apparatus is not impaired.

In addition, since the medium supply tray does not project from the body, no stain or dust is formed on or sticks to the recording medium. This makes it unnecessary to separately equip the medium supply tray with a stain-preventive cover or the like. The apparatus can be made more compact by a degree corresponding to such a cover.

BRIEF DESCRIPTION OF THE DRAWINGS

The present invention may be more readily described with reference to the accompanying drawings.

DETAILED DESCRIPTION OF THE PREFERRED EMBODIMENTS

An image forming apparatus 1 according to an embodiment of the present invention will be hereinafter described in detail with reference to FIGS. 1-8.

Figure 1:
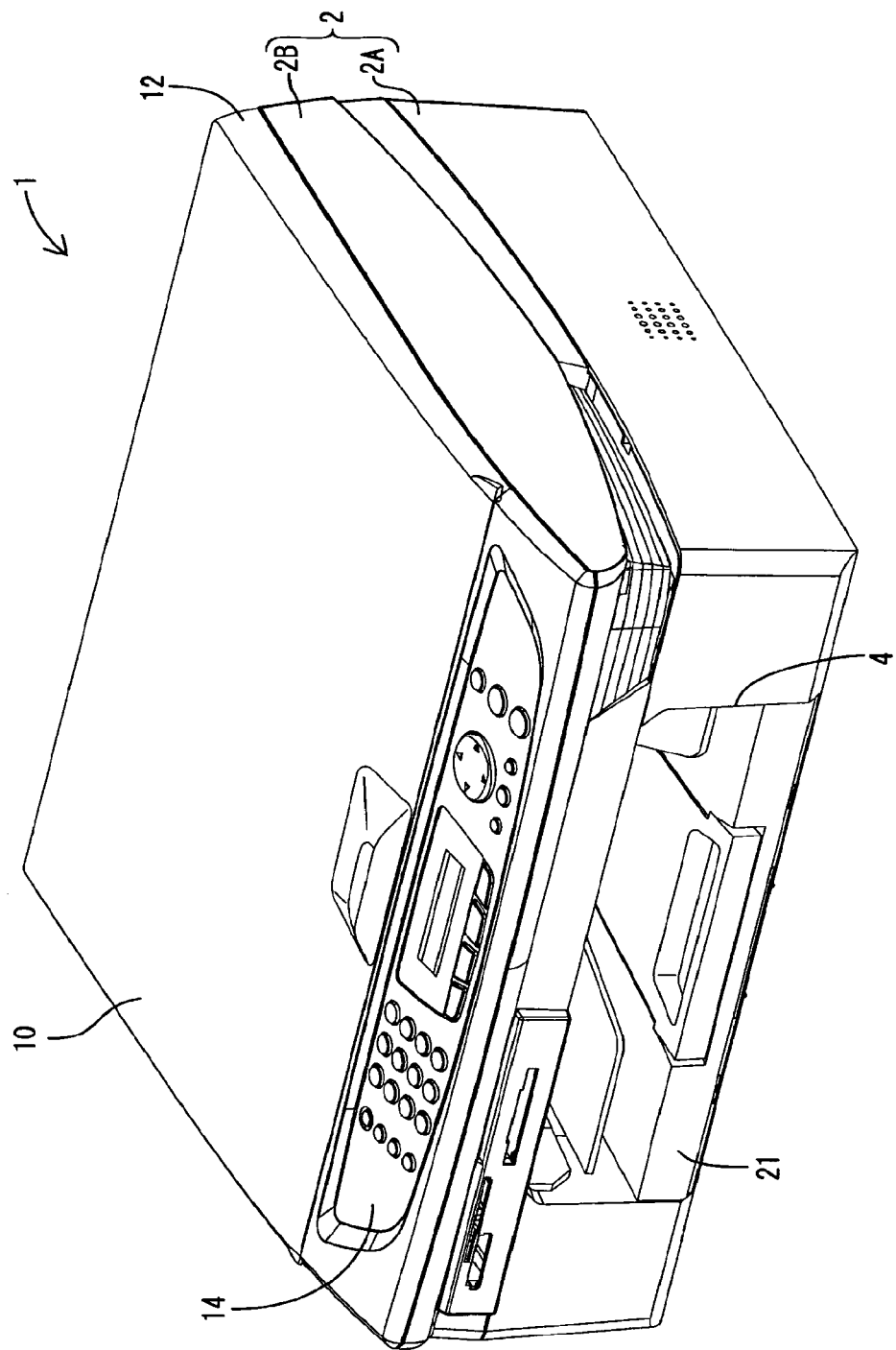
FIG. 1 is a perspective view of an image forming apparatus according to an embodiment.

FIG. 1 shows the image forming apparatus 1 according to the embodiment. This image forming apparatus 1 is a multi-function machine having a facsimile function, a printer function, a scanner function, etc. The apparatus 1 is provided with, in a main body casing 2 that functions as a casing, a scanner unit 10 that functions as a reading mechanism for reading an image, a recording unit 20 that functions as a recording mechanism for performing recording, and an operating panel 14 that functions as an operating section through which to manipulate the scanner unit 10, the recording unit 20, etc.

Incidentally, a side on which the operating panel 14 is disposed in FIG. 1 is referred to as a front side in this embodiment. A direction extending from the front side to an opposite side (rear side) is referred to as a depth direction.

The casing 2 has, as a whole, a box shape that is a square when viewed from above, the square having a side that is one size larger than a longitudinal dimension of the A4-size sheet. The casing 2 is divided into two stages, that is, an angular lower cover 2A and an upper cover 2B that is attached to and covers the top surface of the lower cover 2A. The upper cover 2B houses the scanner unit 10 and the lower cover 2A houses the recording unit 20, whereby the scanner unit 10 and the recording unit 20 are in a stacked state.

The scanner unit 10, which is accommodated in a top portion of the upper cover 2B, is equipped with a contact glass 11 that functions as an original placement portion and is fitted in a top surface portion of the scanner unit 10 and a CIS (contact image sensor) 15 that is disposed under the contact glass 11 and serves to read an image. The contact glass 11 has such a size as to be able to support a maximum of an A4-size original document sheet 6.

The scanner unit 10 is disposed closer to the rear end of the upper cover 2B and is oriented in such a manner that the longitudinal direction of the contact glass 11 is parallel with the width direction of the apparatus 1. A lid plate 12 for pressing an original document sheet while covering the entire surface of the contact glass 11 is disposed on the top surface side of the upper cover 2B. The lid plate 12 is connected to the upper cover 2B via a lid-side hinge 13 that is attached to the top portion of the rear end wall of the upper cover 2B, whereby the lid plate 12 can be opened and closed with respect to the scanner unit 10.

The operating panel 14 is disposed in front of the scanner unit 10. The operating panel 14 has such an oblong shape as to just occupy the space between the front end wall of the scanner unit 10 and that of the casing 2. A liquid crystal screen, buttons to be manipulated for, for example, turning on/off of power, switching among various functions, and setting of image reading or recording conditions, and other things are arranged on the top surface of the operating panel 14.

The upper cover 2B is connected to the lower cover 2A via a cover-side hinge (not shown) that is attached to the top portion of one (the left-hand one as viewed from the front side) of the side walls of the lower cover 2A. This allows the upper cover 2B to be opened and closed with respect to the lower cover 2A.

Figure 2:
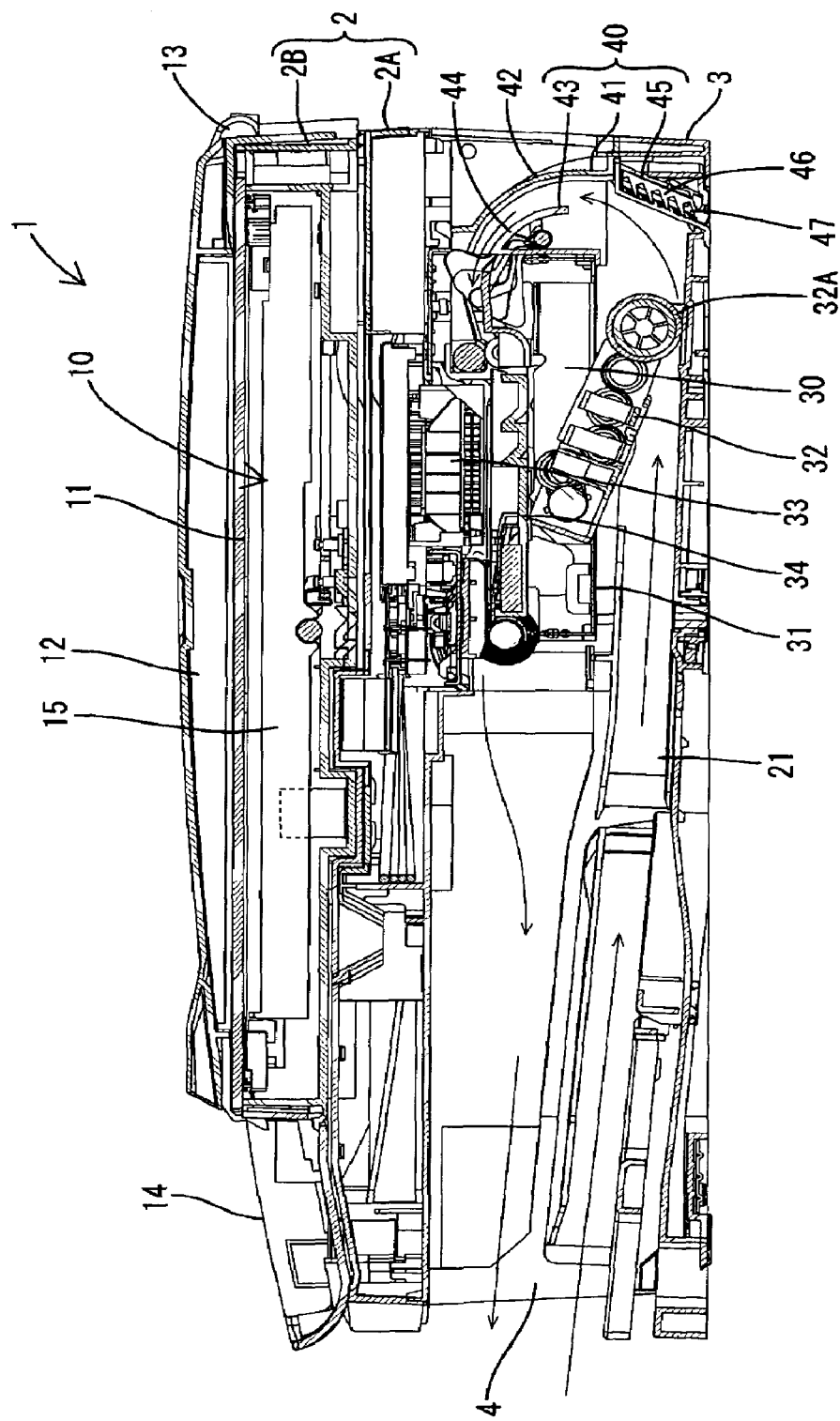
FIG. 2 is a side sectional view of the image forming apparatus.
Figure 3:
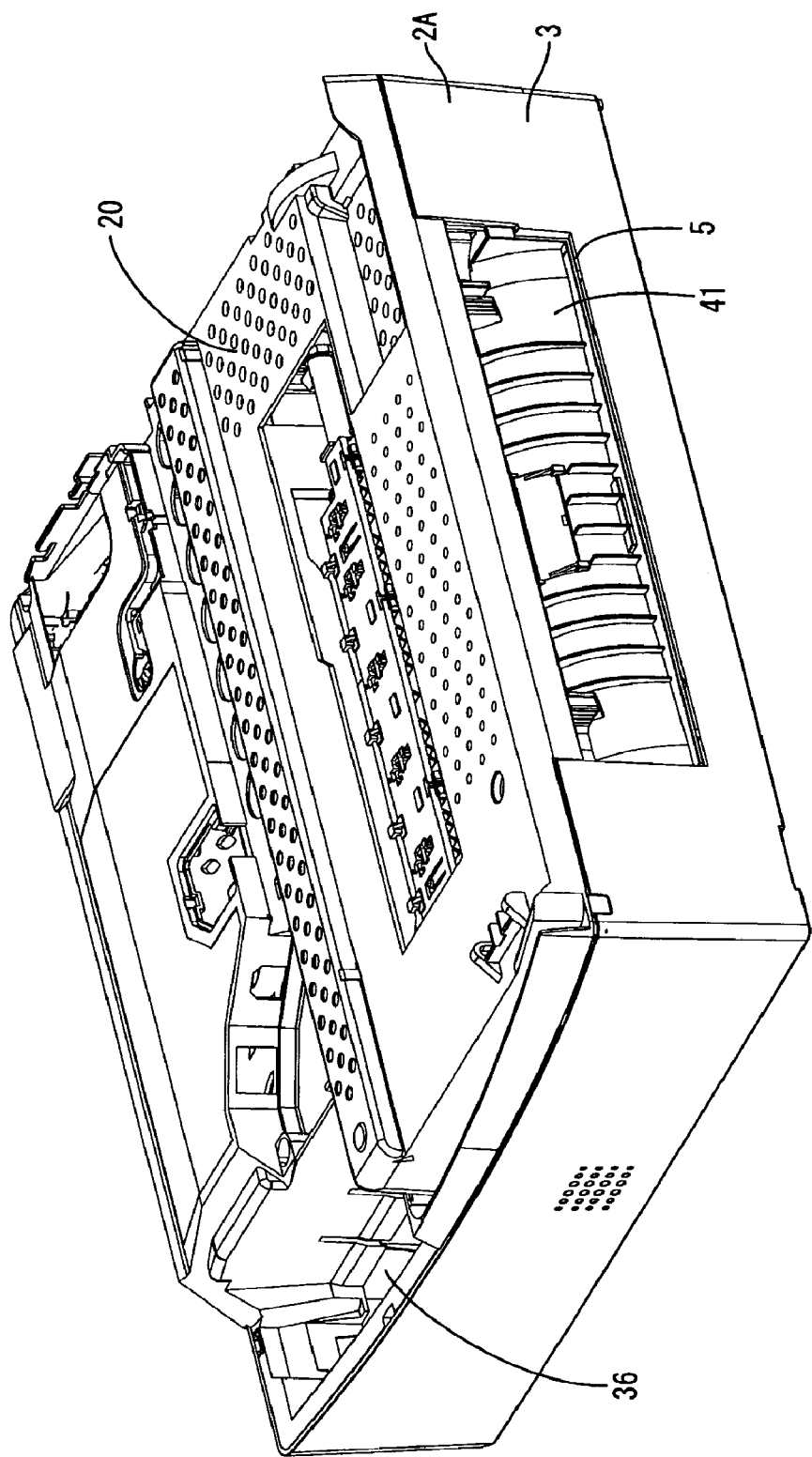
FIG. 3 is a perspective view of a lower cover.
Figure 4:
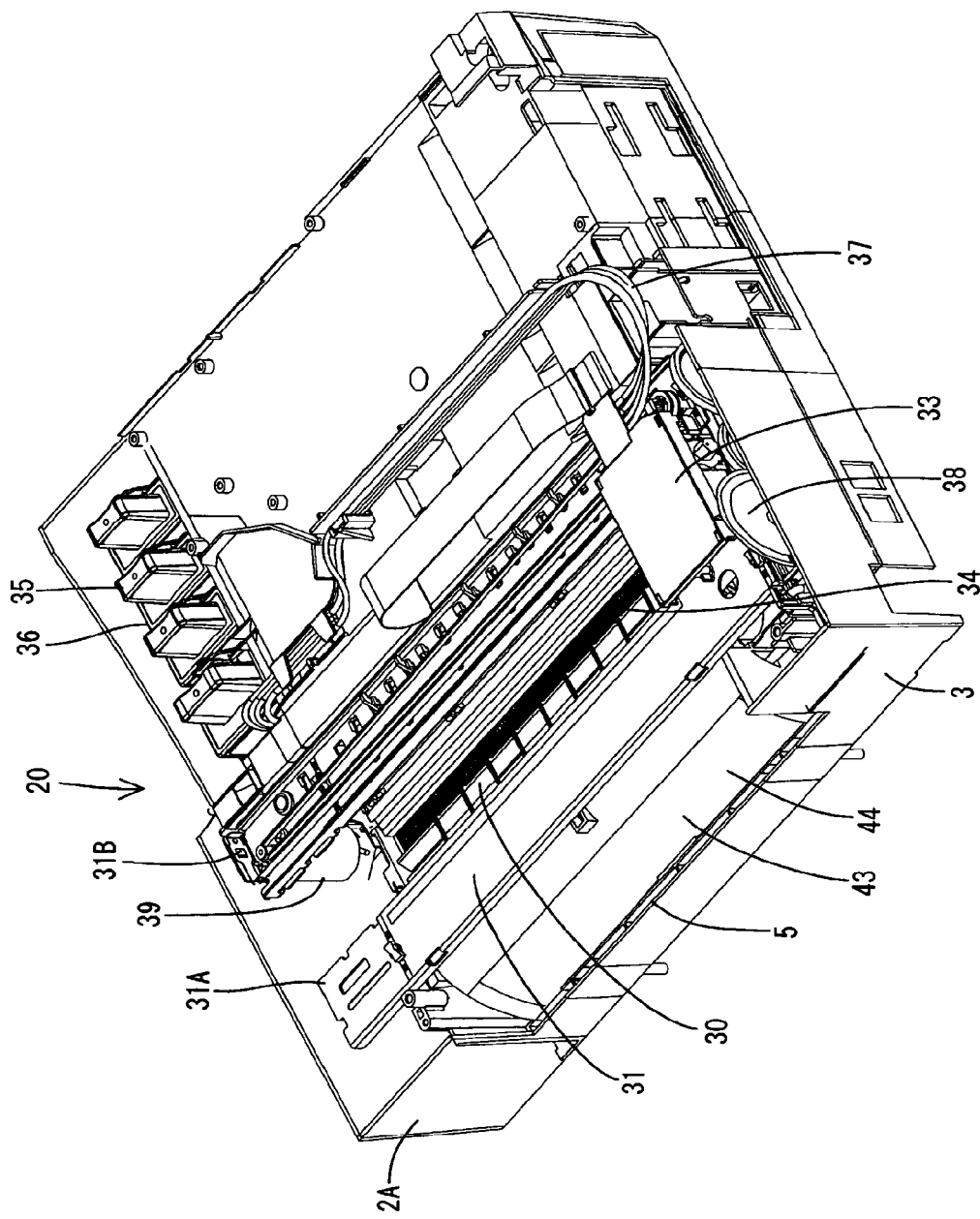
FIG. 4 is another perspective view of the lower cover.
Figure 5:
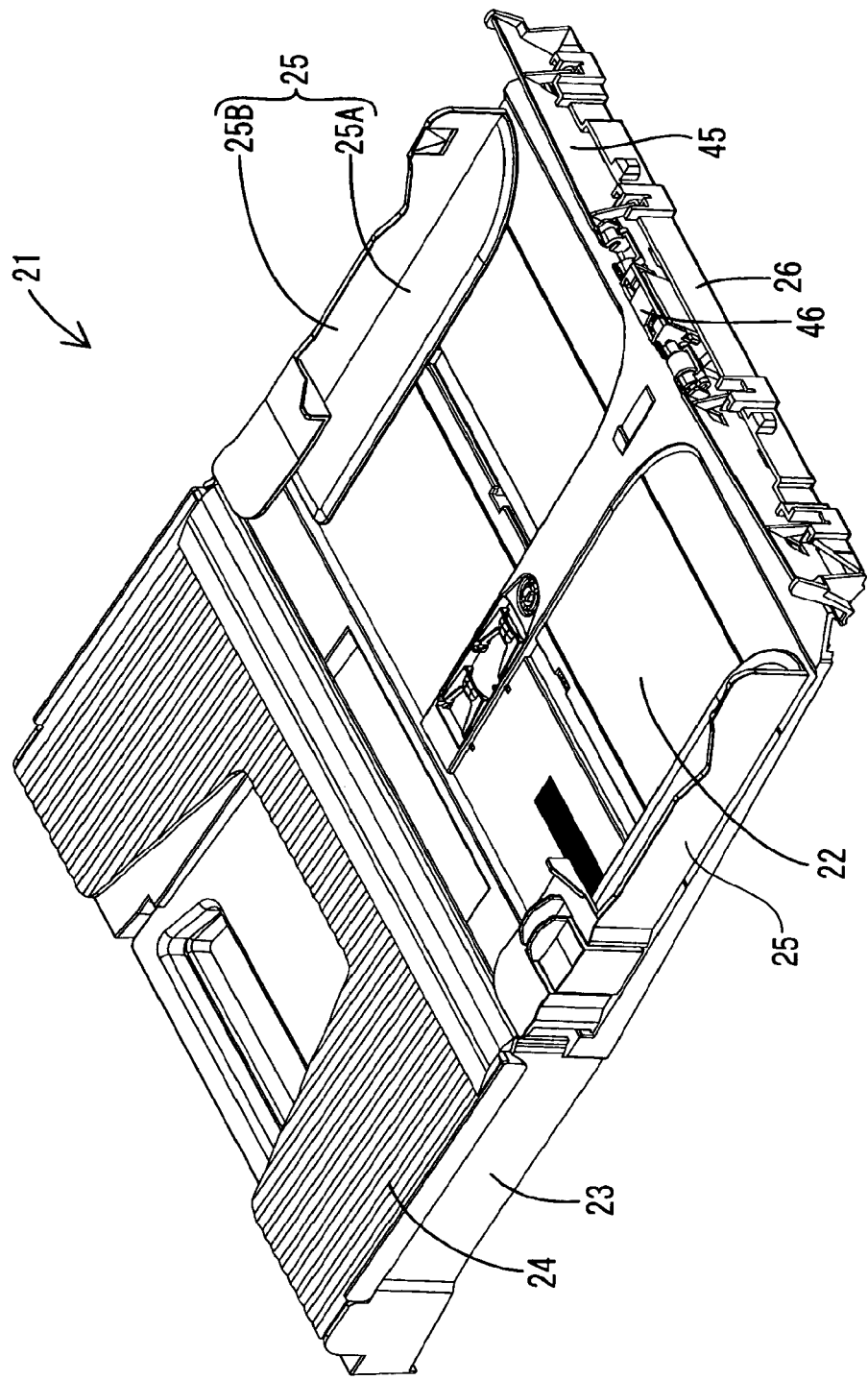
FIG. 5 is a perspective view of a plate portion.
Figure 6:
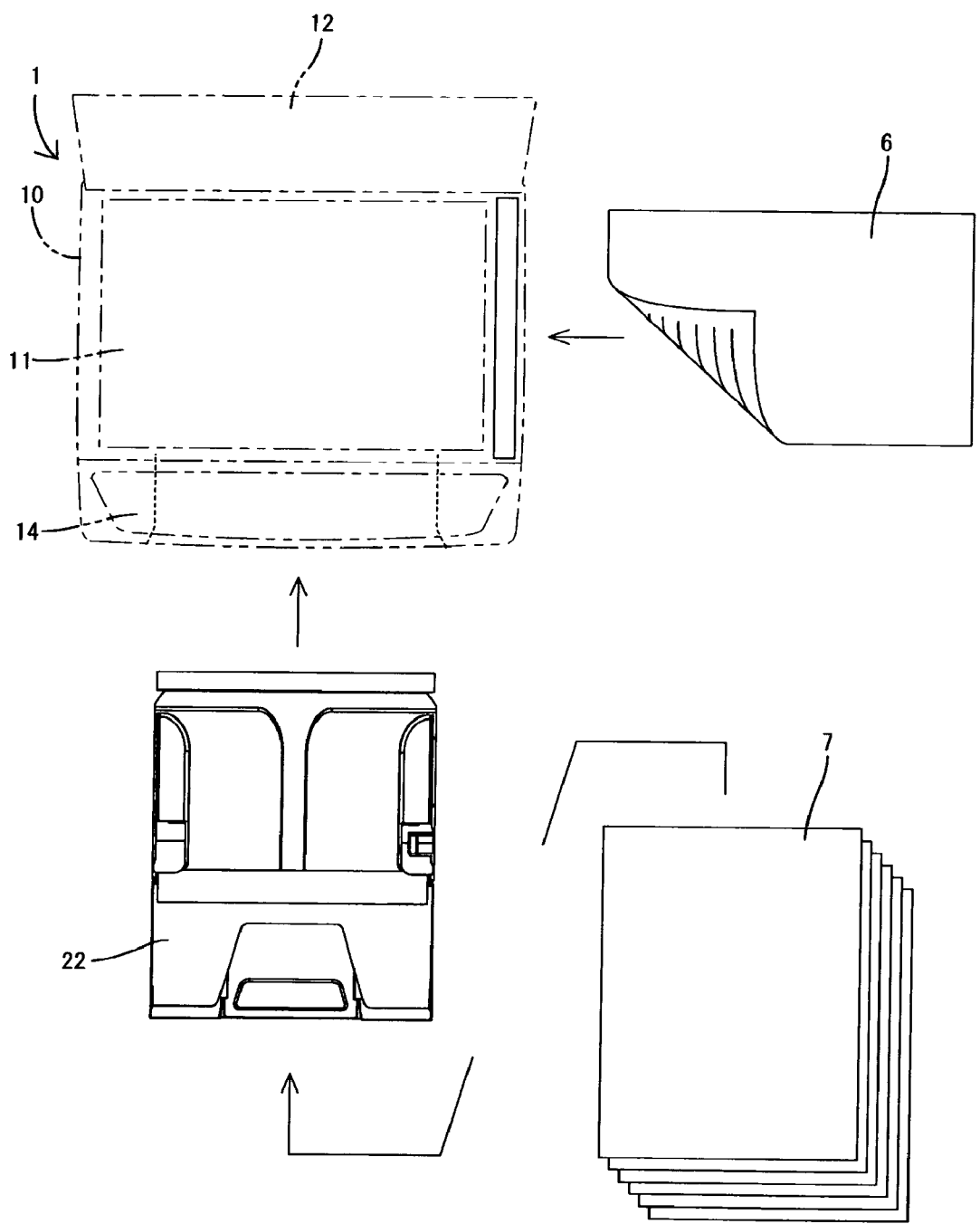
FIG. 6 is a schematic diagram as viewed from above showing an arrangement of individual mechanisms of the image forming apparatus.
Figure 7:
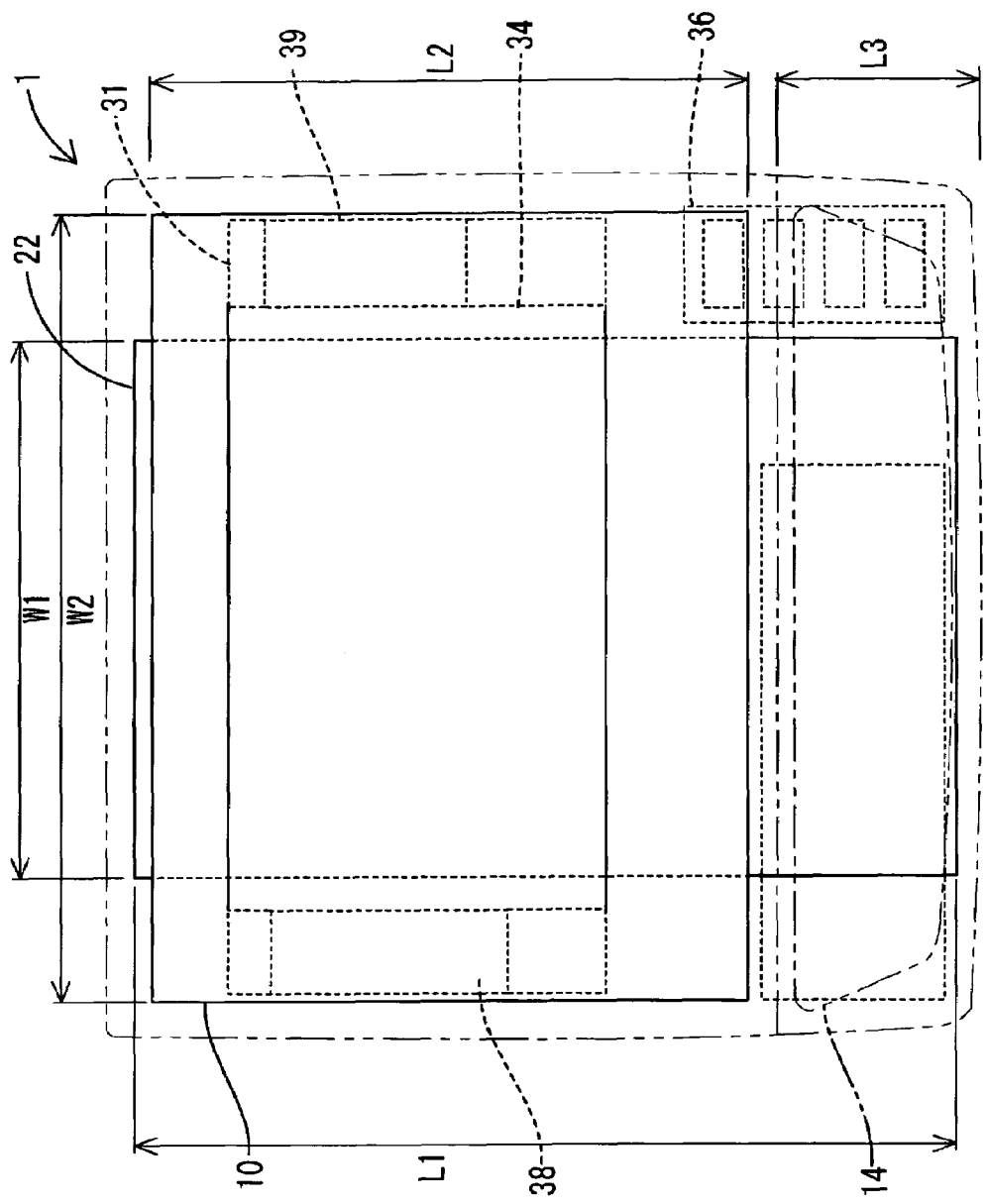
FIG. 7 is another schematic diagram as viewed from above showing an arrangement of individual mechanisms of the image forming apparatus.
Figure 8:
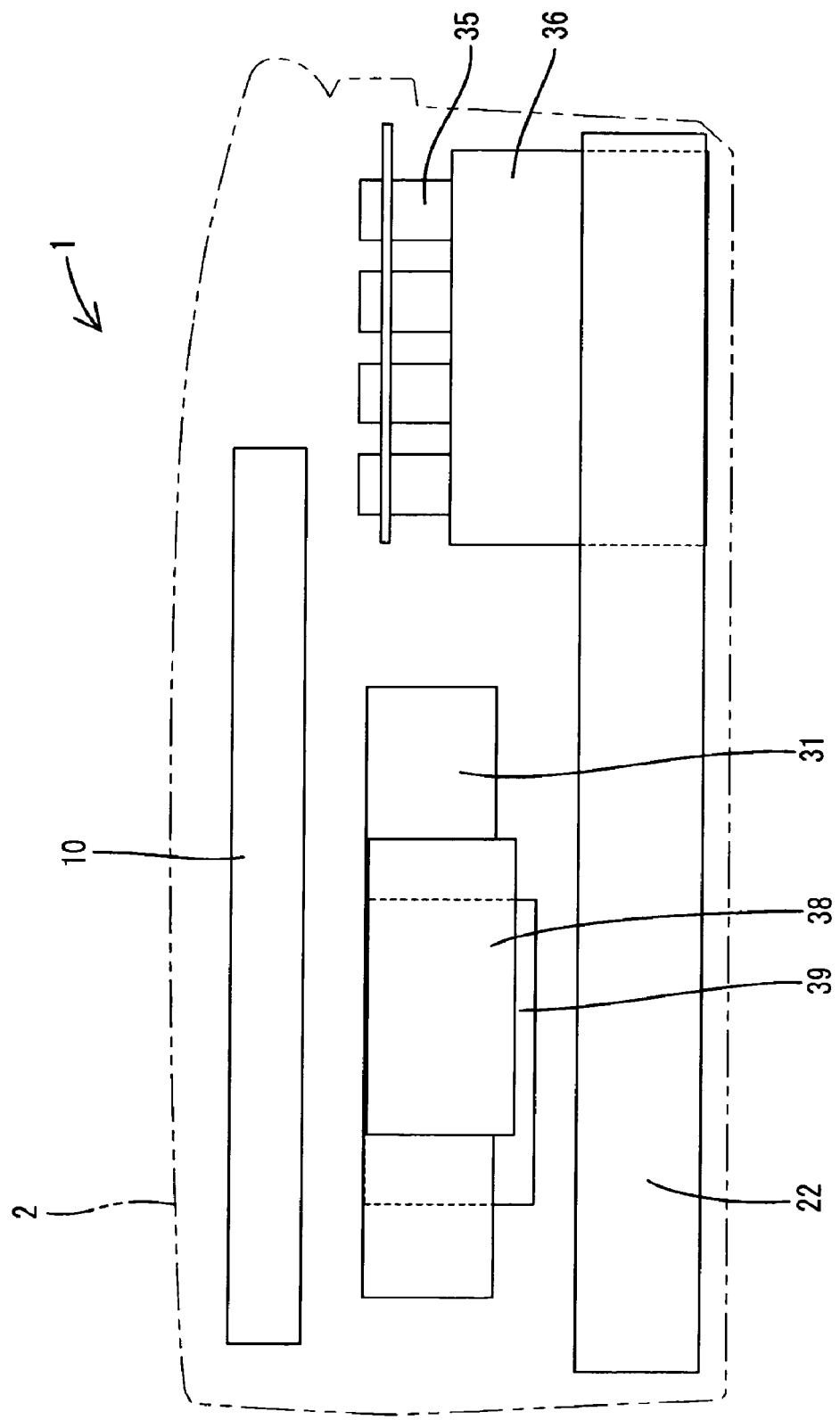
FIG. 8 is a schematic diagram as viewed from one side showing an arrangement of individual mechanisms of the image forming apparatus.

On the other hand, the recording unit 20, which is accommodated in the lower cover 2A, is equipped with a sheet feed cassette 21 in which sheets 7 (recording media) are set, an ink-jet recording section 30 that is disposed above the sheet feed cassette 21, and a reversing guide 40 that is disposed behind the sheet feed cassette 21 and serves to guide a sheet 7 to the recording section 30 while moving it upward and reversing it (see FIGS. 2-4).

The sheet feed cassette 21 is formed into a shallow dish shape having approximately the A4 size and is equipped with a rectangular-plate-like plate portion 22. On the plate portion 22, sheets 7 having a maximum of the A4 size can be set (see FIG. 5). Two fixed side walls 23 erect from the front half of the plate portion 22 on the right and left sides and extend in the front-rear direction. A sheet cover 24 for covering the sheets 7 set on the plate portion 22 from above bridges the two fixed side walls 23. The top surface portion of the sheet cover 24 serves as a sheet ejection tray to which recorded sheets 7 are ejected.

Two side guides 25 for guiding both side ends of sheets 7 are provided on the rear half of the plate portion 22 so as to be spaced from each other in the right-left direction. Each side guide 25 has a plate-like support portion 25A that is placed on the top surface of the plate portion 22 and a plate-like guide portion 25B that is perpendicular to the support portion 25A and extends in the front-rear direction. The two side guides 25 can reciprocate in the width direction so as to keep the same distance from the center of the sheet cassette 21 in the width direction. The sheets 7 to be set in the sheet cassette 21 can be positioned at the center in the width direction by making the distance between the two guide portions 25B equal to the width of the sheets 7. A rear end wall 26 erects upward from the rear end of the plate portion 22 so as to cover the entire width.

A plate attachment portion 4 is provided in a bottom portion, located at its center in the width direction, of the lower cover 2A so as to have a front opening and reach a rear wall 3 of the lower cover 2A. The sheet feed cassette 21 is inserted, in a detachable manner, in a bottom portion of the plate attachment portion 4 in such a manner that its longitudinal direction is kept parallel with the depth direction of the casing 2. When the sheet feed cassette 21 is pushed in until its rear end wall 26 hits the rear wall 3 of the lower cover 2A, the entire sheet feed cassette 21 is housed in the plate attachment portion 4.

The reversing guide 40 for guiding a sheet 7 to the recording section 30 (described later) by U-turning it is disposed above the rear end of the sheet feed cassette 21 so as to cover the entire width. The reversing guide 40 includes an outside arc-shaped guide 41, an inside arc-shaped guide 43, and a guide plate 45.

The guide plate 45 for guiding an incoming sheet 7 upward is attached to the front surface of the rear end wall 26 of the sheet feed cassette 21 so as to cover the entire width. The guide plate 45 is fixed to the rear end wall 26 so as to be slightly inclined from the vertical direction and lean on the rear end wall 26. A metal separation member 46 is attached to the guide plate 45 at the center in the width direction. The separation member 46 is equipped with a plurality of thin-plate-like separation blades 47 that are arranged parallel with each other in the vertical direction at prescribed intervals. Each separation blade 47 is inclined downward toward the front side and its tip slightly projects from the surface of the guide plate 45. The leading edges of sheets 7 that are supplied from the sheet feed cassette 21 are hooked by the tips of the separation blades 47, whereby the sheets 7 are separated from each other. Each sheet 7 is guided upward as it goes along the slant surface of the guide plate 45.

The pair of arc-shaped guides 41 and 43 are disposed above the guide plate 45. The outside arc-shaped guide 41 has an arc-shaped outside guide wall 42 that extends upward from the top end of the guide plate 45 so as to be curved forward. The outside arc-shaped guide 41, which also serves as a jam cover for allowing removal of a sheet that is jammed in the sheet feed path, is attached in such a manner that it can be removed through an oblong, rectangular opening 5 that is formed in the rear wall 3 of the lower cover 2A. The inside arc-shaped guide 43 has an arc-shaped inside guide wall 44 that is disposed inside the outside guide wall 42 so as to form an interval for allowing passage of a sheet 7 and that has the same curvature as the outside guide wall 42. The inside arc-shaped guide 43 is attached to the rear end portion of a frame 31 (described later). A sheet 7 that has been guided upward along the slant surface of the guide plate 45 is U-turned so as to be directed forward as it passes between the two guide walls 42 and 44 (indicated by arrows in FIG. 2).

The recording section 30 for performing recording on a sheet 7 is disposed above the rear portion of the plate attachment portion 4 in front of the two arc-shaped guides 41 and 43. The recording section 30 is equipped with an oblong frame 31 made of a metal. The frame 31 generally has a box-shape that is somewhat longer in the right-left direction than the width of the sheet feed cassette 21. Two guide plates 31A and 31B extending in the right-left direction are arranged parallel with each other in the front-rear direction are disposed above the frame 31. A carriage 33 having a recording head is mounted on the guide plates 31A and 31B so as to bridge them. A platen member 34 for supporting a sheet 7 from below, a sheet feed roller, etc. (not shown in detail), are provided inside the frame 31 below the two guide plates 31A and 31B. Although not shown in the drawings in detail, driving sections 38 and 39 for driving the carriage 33, the sheet feed roller, etc., a waste ink cartridge, a maintenance unit for maintenance of the recording head, a standby space where the carriage 33 stands by while recording is not performed, and other things are provided on both sides of the frame 31 at positions outside the width of a sheet 7 that passes by the frame 31. Further, a sheet feed arm 32 having a sheet feed roller 32A for moving sheets in the sheet feed cassette 21 rearward is disposed under the frame 31.

A cartridge holder 36 that houses ink cartridges 35 is disposed on the front side of the frame 31 beside the sheet feed cassette 21. The cartridge holder 36 is provided with liquid sending tubes 37, which run above the plate attachment portion 4 and are connected to the carriage 33. Inks are supplied from the ink cartridges 35 to the recording head via the respective liquid sending tubes 37.

A sheet 7 that has been U-turned while being guided by the two arc-shaped guides 41 and 43 is sent onto the platen member 34 and moved forward by the sheet feed roller by a prescribed length each time. At the same time, the carriage 33 is reciprocated in the width direction and ink droplets are jetted out of the recording head on the basis of prescribed data. As a result, an image is recorded on the sheet 7. The recorded sheet 7 is ejected onto the sheet cover 24 of the sheet feed cassette 21.

As described above, in this embodiment, the scanner unit 10 is provided in the upper cover 2B of the casing 2 with such orientation that the longitudinal direction of the contact glass 11 is parallel with the width direction of the casing 2 and the operating panel 14 is provided in front of the scanner unit 10. On the other hand, the recording unit 20 is provided in the lower cover 2A with such orientation that the longitudinal direction of the sheet feed cassette 21 is approximately parallel with the depth direction of the casing 2 (see FIGS. 6-8).

The reversing mechanism that allows the sheet feed path of a sheet 7 to approximately fit into a space having a width W1 and a length L1 of the sheet feed cassette 21 is employed as a part of the mechanism for sheet feeding. The sheet feed cassette 21 can be pushed in until its rear end wall 26 hits the read wall 3 of the lower cover 2A. When the sheet feed cassette 21 is thus pushed in, the entire sheet feed cassette 21 is housed in the plate attachment portion 4 of the casing 2. In other words, setting the rear end wall 26 of the sheet feed cassette 21 at the position that is approximately as deep as the position of the rear end of the scanner unit 10 allows the sheet feed cassette 21, which is longest and hence tends to project outward, to fit into a range that is a depth L2 of the scanner unit 10 plus a depth L3 of the operating panel 14 (see FIG. 7).

Since the longitudinal directions of the scanner unit 10 and the sheet feed cassette 21 are set parallel with the width direction and the depth direction, respectively, certain spaces are secured between the side ends of the space occupied by the sheet feed path and the side ends of the scanner unit 10. The driving section 38 and other members can be disposed in those spaces.

With the above measures, all the necessary mechanisms can be housed in the angular casing 2 that occupies a range defined by a width W2 and the depth L2+L3 of the scanner unit 10 plus the operating panel 10. This facilitates packing at the time of shipment and reduces the installation space. Further, the design performance of the entire apparatus 1 is not impaired.

Further, since the sheet feed cassette 21 does not project from the casing 2, no stain or dust is formed on or sticks to a sheet 7. This makes it unnecessary to separately equip the sheet feed cassette 21 with a stain-preventive cover or the like. The apparatus 1 can be made more compact by a degree corresponding to such a cover.

In addition, the reversing mechanism reverses a sheet 7 upward while moving it upward. With this structure, the sheet feed roller 32A, the platen member 34, etc., can be incorporated by utilizing the space between the lower, go path (supply path) and the upper, return path (ejection path). This increases the compactness in the vertical direction and thereby makes it possible to reduce the installation space of the apparatus 1 further.

As described above, the reversing mechanism in this embodiment has the reversing guide 40 that guides the recording medium as it is reversed, and a rear end position of the reversing guide 40 is substantially the same as the rear end position of the reading mechanism 10.

Further, a rear end position of the medium supply tray 21 is substantially the same as the rear end position of the reading mechanism 10.

In addition, the reversing mechanism reverses the recording medium while moving the recording medium upward.

Other Embodiments

The technical scope of the invention is not limited to the above-described embodiment. For example, the technical scope of the invention encompasses the following configurations as well as equivalents. (1) Although in the above embodiment the reversing mechanism reverses a sheet 7 while moving it upward, the reversing mechanism may be such as to reverse a sheet 7 while moving it downward. (2) Although in the above embodiment the scanner unit 10 and the recording unit 20 can deal with an original document or a sheet having a maximum of the A4 size, the maximum size of an original document or a sheet that can be handled is not limited to the one employed in the above embodiment and may be set to a proper size such as the B4 size or the A3 size in accordance the use. (3) In the above embodiment, the outside arc-shaped guide 41 also serves as the jam cover for allowing removal of a jammed sheet and is attached in such a manner that it can be removed through the opening 5 of the lower cover 2A. However, the reversing guide may be provided separately from a jam cover and may be attached in such a manner that it cannot be removed from the outside.

What is claimed is:

1. An image forming apparatus comprising:
    a reading mechanism that reads an image on an original document, the reading mechanism having an original placement portion on which the original document is placed;
    a recording mechanism that records an image on a recording medium, the recording mechanism having a medium supply tray on which the recording medium is set and a reversing mechanism that reverses a transporting direction of the recording medium;
    a casing that houses the recording mechanism, the casing being stacked with respect to the reading mechanism; and
    an operating section through which the image forming apparatus is manipulated;
    wherein the reading mechanism is disposed in such a manner that a longitudinal direction of the original placement portion is substantially parallel with a width direction of the casing and the operating section is disposed on a front side of the reading mechanism;
    the medium supply tray is disposed in such a manner that a longitudinal direction of the medium supply tray is substantially parallel with a depth direction that is perpendicular to the width direction of the casing, and the reversing mechanism is disposed on a rear end side in the depth direction; and
    a rear end position of the reversing mechanism is set substantially the same as a rear wall position of the reading mechanism, and a dimension of the recording mechanism in the depth direction is equal to or less than a sum of a depth of the reading mechanism plus a depth of the operating section.

2. The image forming apparatus according to claim 1, wherein the reversing mechanism comprises a reversing guide that guides the recording medium as it is reversed, and a rear end position of the reversing guide is substantially the same as the rear wall position of the reading mechanism.

3. The image forming apparatus according to claim 1, wherein a rear end position of the medium supply tray is substantially the same as the rear wall position of the reading mechanism.

4. The image forming apparatus according to claim 1, wherein the reversing mechanism reverses the recording medium while moving the recording medium upward.

5. The image forming apparatus according to claim 1, further comprising an upper casing that houses the reading mechanism and the operating section, the upper casing being stacked on the casing.

6. An image forming apparatus comprising:
    a reading mechanism that reads an image on an original document, the reading mechanism having an original placement portion on which the original document is placed;
    a recording mechanism that records an image on a recording medium, the recording mechanism having a medium supply tray on which the recording medium is set and a reversing mechanism that reverses a transporting direction of the recording medium;
    a casing that houses the recording mechanism, the casing being stacked with respect to the reading mechanism; and
    an operating section through which the image forming apparatus is manipulated;
    wherein the reading mechanism is disposed in such a manner that a longitudinal direction of the original placement portion is substantially parallel with a width direction of the casing and the operating section is disposed on a front side of the reading mechanism;
    the medium supply tray is disposed in such a manner that a longitudinal direction of the medium supply tray is substantially parallel with a depth direction that is perpendicular to the width direction of the casing, and the reversing mechanism is disposed on a rear end side in the depth direction; and
    a dimension of the recording mechanism in the depth direction is not more than a sum of a depth of the reading mechanism plus a depth of the operating section.

* * * * *